(12) United States Patent
Alazemi

(10) Patent No.: US 7,927,178 B2
(45) Date of Patent: Apr. 19, 2011

(54) BEE HOUSE

(76) Inventor: Fahd E. M. A. Alazemi, Ali Sabah Salem Area (KW)

( * ) Notice: Subject to any disclaimer, the term of this patent is extended or adjusted under 35 U.S.C. 154(b) by 217 days.

(21) Appl. No.: 12/259,362

(22) Filed: Oct. 28, 2008

(65) Prior Publication Data
US 2010/0105282 A1 Apr. 29, 2010

(51) Int. Cl.
*A01K 47/00* (2006.01)
*F24F 7/02* (2006.01)

(52) U.S. Cl. ............. 449/26; 449/14; 119/448; 47/29.5; 454/250

(58) Field of Classification Search ................ 449/3, 13, 449/14, 15, 26, 27, 29; 47/22.1, 29.5; 119/448, 119/500; 454/250
See application file for complete search history.

(56) References Cited

U.S. PATENT DOCUMENTS

| | | | |
|---|---|---|---|
| 64,334 A | 4/1867 | Kraiss | |
| 109,702 A * | 11/1870 | Wood | 449/26 |
| 119,336 A | 9/1871 | Edwards | |
| 128,005 A | 6/1872 | Alley | |
| 194,048 A | 8/1877 | Potter et al. | |
| 207,958 A * | 9/1878 | Erwin | 449/26 |
| 270,666 A | 1/1883 | Hildreth | |
| 302,834 A | 7/1884 | Franklin | |
| 306,357 A | 10/1884 | Smith | |
| 1,973,029 A * | 9/1934 | Walston | 52/64 |
| 2,530,801 A * | 11/1950 | Babcock, Jr. | 449/14 |
| 4,346,490 A * | 8/1982 | Katz et al. | 449/2 |
| 4,444,020 A | 4/1984 | Varga | |
| 5,741,170 A | 4/1998 | Orletsky et al. | |
| 5,895,310 A * | 4/1999 | Otomo et al. | 449/1 |
| 6,546,743 B1 | 4/2003 | Sullivan et al. | |

OTHER PUBLICATIONS

Winter Management, CIS 538 rev. Part 2, http://www.pollinatorparadise.com/beemanage/BeeManageWin.htm Jul. 19, 2007.
Western Honey Bee, Wikipedia, http://en.wikipedia.org/wiki/Western_honey_bee.
William P. Nye, Beekeeping Regions in the United States, http://maarec.cas.psu.edu/bkCD/Startkeeping/regions.html Jul. 20, 2007.
Bees for Development: Cool Operators, http://www.beesfordevelopment.org/info/info/managing Jul. 20, 2007.

* cited by examiner

*Primary Examiner* — Rob Swiatek
(74) *Attorney, Agent, or Firm* — Lowe Hauptman Ham & Berner, LLP

(57) ABSTRACT

A bee house for housing a plurality of bee hives includes a generally rectangular frame and four upwardly extending opaque fixed walls fixed to the frame and a gable roof having a generally triangular cross-section. The roof has a peak and a pair of eaves or outer edges below its peak and defines a longitudinally extending opening between a pair of roof panels at or along the peak. The bee house also includes a plurality of shelves for holding three bee hives on each shelf and an air-conditioner for maintaining the bee house at a temperature of between about 25° C. and 35 C.

2 Claims, 7 Drawing Sheets

BEE HOUSE

BACKGROUND FOR THE INVENTION

Bee keeping has been practiced for many years and used for pollination of plants as well as the production of honey and other products. Notwithstanding growth in the industry bee keeping methods and hives have seen little change in the past century. For example, beehives are typically a type of box in which multiple frames are stored. The frames are wood or plastic boards hung in the hive onto which honey bees draw out wax (honey comb). The honey bees use the honey comb, to raise young, store pollen and store honey. These frames are removable from the hives allowing a beekeeper to remove honey and otherwise work with the hive.

In practice the hives provide the bees with protection from the elements. Therefore, the hives should be weather tight and well insulated. Also, the hives must maintain the proper spacing between the frames and between the frames and sides. Typical hives are generally poorly insulated which can cause severe problems in arid regions with excessive temperature. Such hives are relatively unstable, easily fall over and break apart. Further, such hives are not easily sealed.

One approach to an improved beehive is disclosed in the U.S. Pat. No. 5,741,170 of Orletsky et al. for a "Modular Beehive". As disclosed therein, a hive system for a plurality of bee colonies comprises a framework and a plurality of insulated perimeter walls forming a hive system with interior space. At least one divider wall is used to divide the interior space into a plurality of bee chambers with each bee chamber housing one colony.

Notwithstanding the well established practice in using portable hives for one to four colonies per hive, it is presently believed that there is a need for an improved approach to bee keeping in accordance with the present invention. The new approach contemplates the use of a bee house for housing a plurality of hives wherein the hives may be of conventional design or made relatively inexpensively in view of the protection of an outer house in accordance with the present invention. Such houses provide added protection against the elements, better protection for the bees and are particularly designed for areas of relatively high temperatures and for areas requiring a high concentration of bees for pollination or production of honey. Further, it is presently believed that the bee houses in accordance with the present invention facilitate the work of a beekeeper and reduce the likelihood or number of stings experienced by the beekeeper.

BRIEF SUMMARY OF THE INVENTION

In essence, the present invention contemplates an air-conditioned bee house for accommodating a plurality of bee hives. The bee house comprises a rectangular frame and four upwardly extending opaque walls with a gable roof having a triangular cross-section including a longitudinally extending peak and a pair of outer or lower edges or eves. The roof also defines a longitudinally extending opening at or near its apex. The house also includes air-conditioning means for maintaining the temperature in the range of 25° C. to 35° C.

In a preferred embodiment of the invention, the bee house is adapted to contain 30 or more hives and includes means for adjusting the width of the longitudinal opening in the roof. The means for adjusting the width of the opening may comprise a simple gear and handle assembly for sliding one roof panel away from another or for moving each roof panel, one on each side of the apex, away from or towards the other.

DESCRIPTION OF THE PREFERRED EMBODIMENTS OF THE INVENTION

Figure 1:
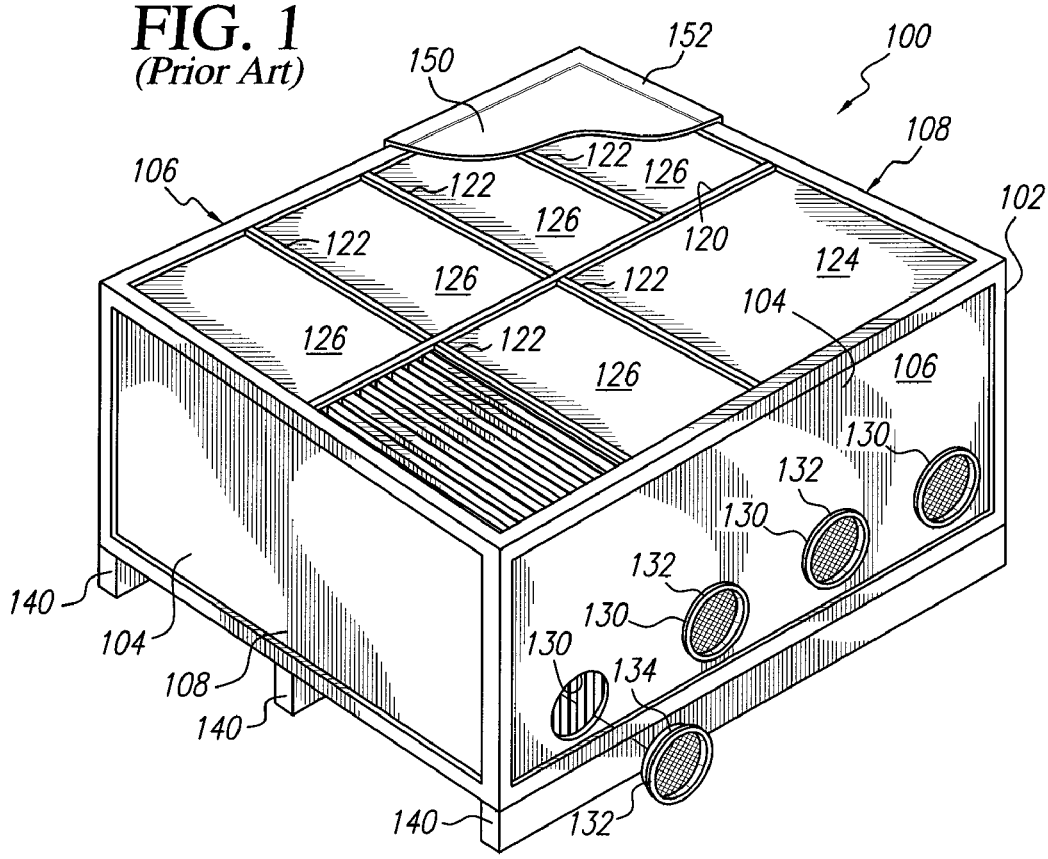
FIG. 1 is a perspective view of a prior art hive system.

FIG. 1 is a perspective view of a prior art hive system 100. The hive system 100 comprises a hive system body 102 wherein the hive system body 102 is a rectangular parallelpiped with a ridged frame work outlining the exterior corner edges of the rectangular parallelpiped. As shown, there are four exterior perimeter walls 104 each of which includes two front walls 106 and two side walls 108. The prior art system 100 contains a plurality of sized bee colonies that each hold industry standard size frames that are inherently stable and easy to move. The height of the exterior perimeter walls are such that the bee system is able to house eight colonies of honey bees each with a hive chamber that holds fourteen industry standard type frames with appropriate spacing.

The exterior walls 104 sit on a hive system floor 115 and framework 102. The exterior perimeter walls 104 comprise a multi-layered wall with an exterior surface portion 110 comprising a suitable weather resistant material such as thin plastic. The plastic is preferably ultra-violet light resistant polypropylene.

The exterior surface portion 110 is sealed to framework 102 on the bottom edge to prevent water from leaking between the framework 102 and exterior surface portion 110 into the hive system 100. The preferred method of sealing uses a bead of ultra-violet light resistant silicone between the surface portion 110 and the framework 102.

The exterior perimeter walls 104 also preferably comprise a core 111. The core 111 provides increased insulation for the hive system 100. The core 111 is made of an insulating material such as expanded polystyrene or other insulting foam. The interior portion of the walls is preferably made of a wood interior 112. The wood sheet 112 comprises a structural paneling such as plywood or etc. to maintain proper spacing in hive system 100 with the preferred dimensions. The wood interior portions 112 are for example ½ inch thick wood with nominal thickness of 15/32 second inches.

In the prior art systems, a vent space (not shown) exists between the wood interior portion 112 and the core 111. The vent space creates a path for moisture from inside the hive to vent reducing the possibility of wood rot. The vent space can be maintained by a variety of methods. One easy method uses a few thin strips of wood or plastic between the wood interior 112 and the core 111.

An air space is created between the exterior surface portion 110 and the core 111. This core space can be created by providing a polypropylene exterior surface portion 110 that is cut precisely to fit the framework 102. The polypropylene exterior expands when heated by ambient air temperature or direct sun light causing it to bow out approximately ½ inch creating an air space. The exterior walls 104, including the exterior surface portion 110, core 111 and wood interior 112, are not necessarily permanently fastened to the hive system and can be easily replaced when needed. As shown in FIG. 1, the hive system 100 also comprises at least one divider wall (e.g. 120 and 122). The divider walls served to divide the interior space of the hive system 100 into a plurality of hive chambers for housing a plurality of bee colonies. The divider walls include a center divider wall 120 extending from one side wall 108 to the other. Thus, the center divider wall 120 divides the interior hive system space in to two portions. Each of these portions can then be sub-divided into a plurality of hive chambers by the use of additional divider walls in particularly sub-divider walls 122.

The number of divider walls 122 can be adjusted to allow the hive system 100 to house the desired member of honey bee colonies in separate hive chambers. Additionally, the size of the hive chambers themselves can be varied. This allows the hive system 100 to store honey bee colonies of different strengths that require different size hive chambers.

None of the divider walls are permanently attached to the hive system. Thus, all divider walls such as center divider wall 120 and sub-divider walls 122 can be removed easily and replaced when needed. These divider walls are wood such as plywood. To maintain proper spacing in hive system 100 the preferred dimensions the divider walls are basically ½ inch plywood.

As shown, the hive system 100 includes six sub-divider walls 122 in addition to the center divider wall 120. Thus, the hive system 100 can be divided into eight hive chambers and is covered with a chamber lid 126 (in FIG. 1 one lid is removed to show the frames within the hive chamber). Each chamber lid 126 preferably has a slot about ⅛ inches thick an three inches long. The slot facilitates a hive tool being used to lift the chamber lid. When the hive system is made according to normal dimensions, each of the eight hive chambers can hold two levels of seven standard Langstroth sized frames for a total of fourteen frames.

Thus, the house is divided into eight fourteen framed bee colonies and is optimized for use in an agricultural pollination operation. In addition, one or more sub-dividers can be removed resulting in two ten frame chambers becoming one thirty frame chamber (removing the sub-divider adds room for one additional frame on each level). When the hive system is dimensioned as stated above one sub-divider can be placed directly on top of the combined hive chambers. A sub-divider 124 substantially identical to the other sub-dividers 122 and can be replaced on top of the hive chamber lids (not shown in FIG. 2) forming one large hive chamber. Thus the sub-divider 124 seals the larger hive chamber by blocking the gap that exists between the chamber lids when the sub-divider wall is removed. Each of the walls front walls 106 has a plurality of hive openings with at least one opening provided for each of the plurality of bee colonies. Plastic ABS couplets are inserted into the hives openings 130. The ABS couplets are designed to fit over standard ABS pipe that is commonly used for drainage in residential housing. The plastic ABS couplets used are preferably adapted to use with three diameter ABS pipe. This allows three inch diameter ABS pipe to fit into the hive openings 130 to facilitate a wide variety of accessories being placed in the opening. These fittings can thus be easily affixed by sliding the ABS pipe into the fitting as needed. Other suitable entrance sizes and materials may be used.

For example, a hive closure adapter 132 can be adapted by stretching tight wire mesh across a portion of the ABS pipe 134. With a hive closure adapters 132 inserted into the ABS couplers the hive openings 130 are sealed such that bees cannot escape the hive system 100. This allows a hive system to be transported without the normally required extensive and expensive netting over the truck. As another example, number four mesh on a pipe can serve as a mouse excluder while allowing the bees to come and go. Other possible accessories can easily be made from three inch ABS include frog excluders, entrance reducers and pollen traps. Thus, the hive system is easy to move without expensive netting and is easy to attach a variety of hive entrance fittings.

To facilitate moving the hive system 100 an integrated pallet base 140 is provided on the underside of the hive system 100. The pallet base comprises standard treated 2×4s screwed into the frame work 102. This allows a hive system 100 to be easily loaded and unloaded using a conventional fork lift. Also, each of the three rails 140 can be replaced if needed with the pallet base and the inherent stability of the design. Fork lifts can be used to easily and rapidly distribute the hive systems across fields. This allows the hives to be placed for additional pollination of agricultural crops and honey production.

Figure 2:
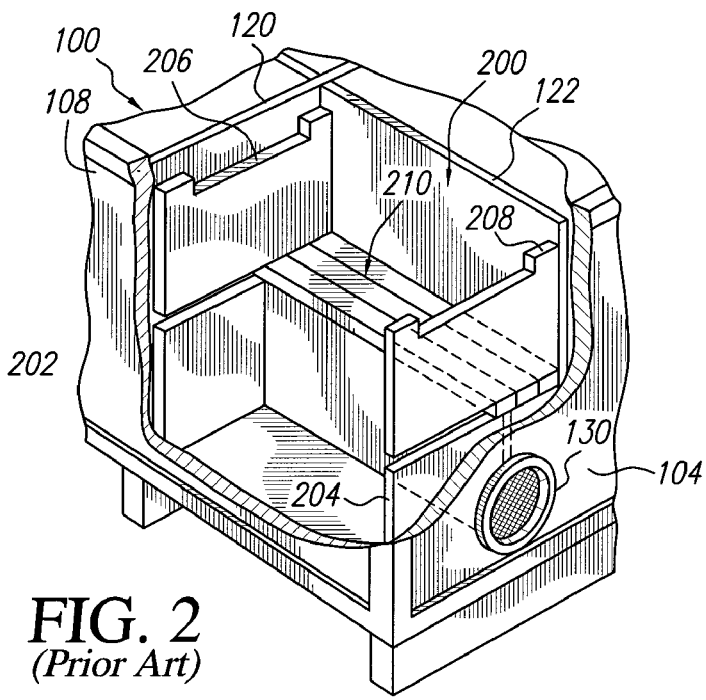
FIG. 2 is a cut away view of a prior art hive chamber of the system shown in FIG. 1.
Figure 3:
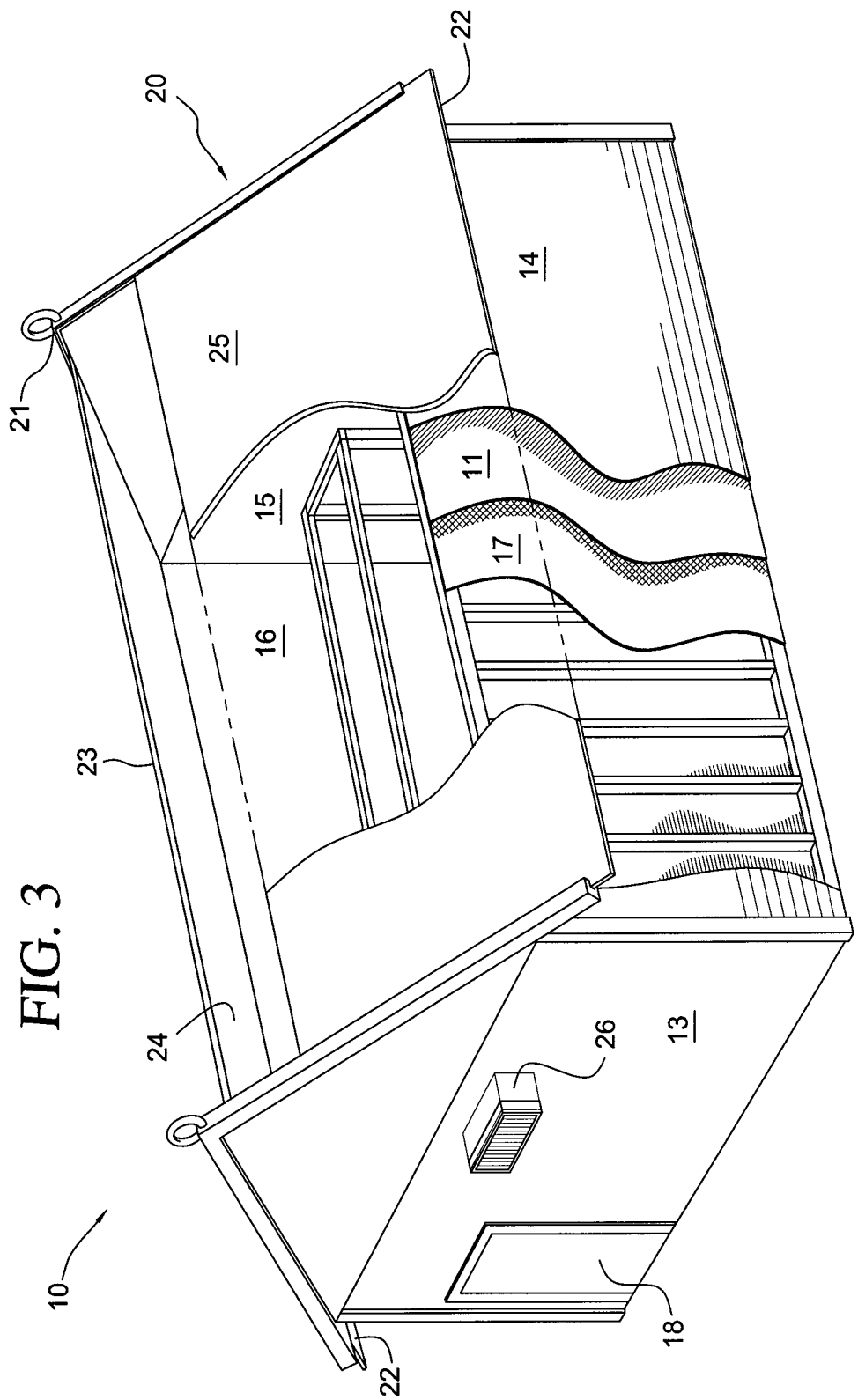
FIG. 3 is a perspective exterior view of a bee house in accordance with a first embodiment of the invention.
Figure 4:
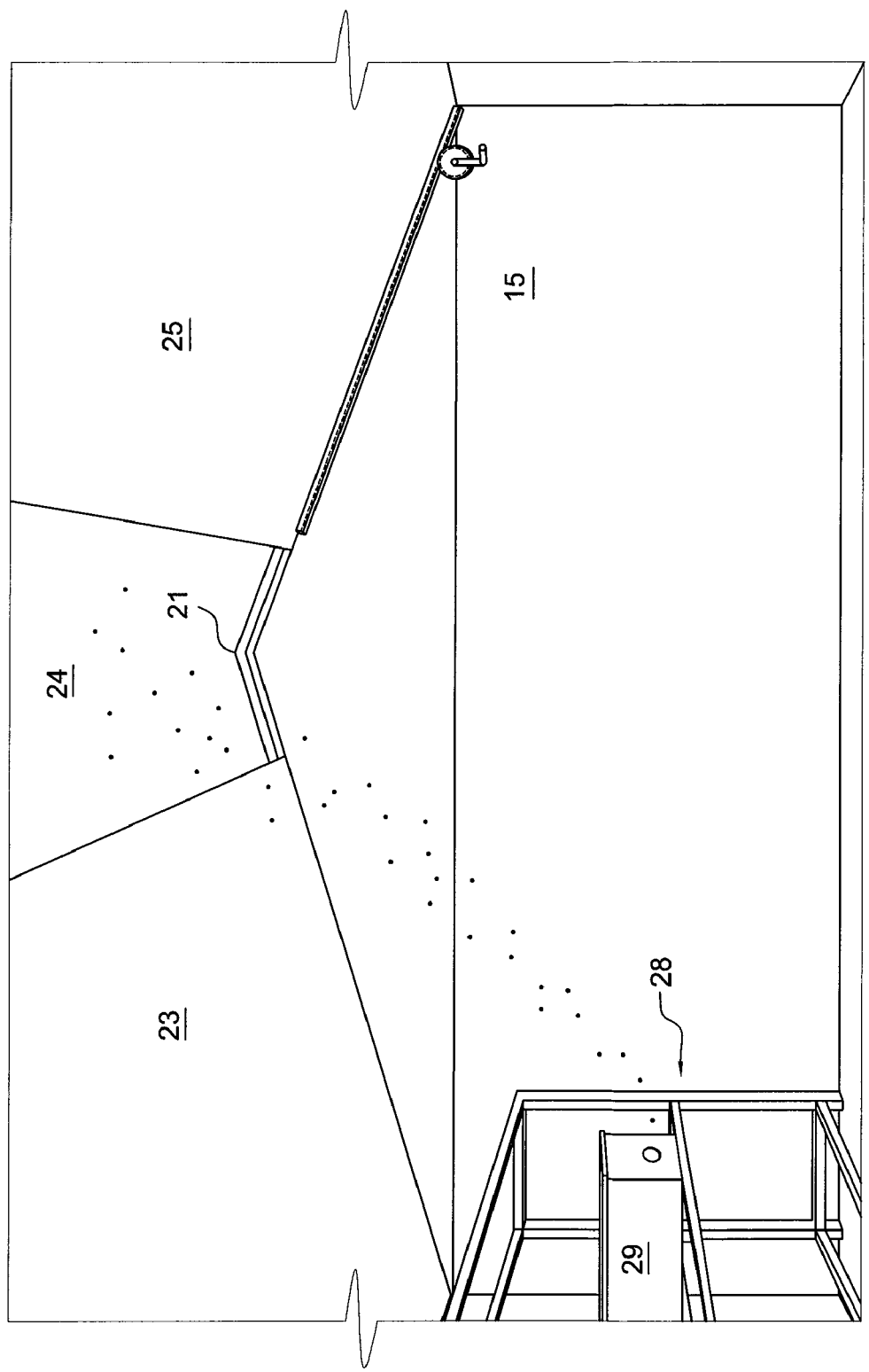
FIG. 4 is a perspective interior view of a bee house in accordance with the invention and illustrating the path of bees coming to or leaving from the bee house.
Figure 5:
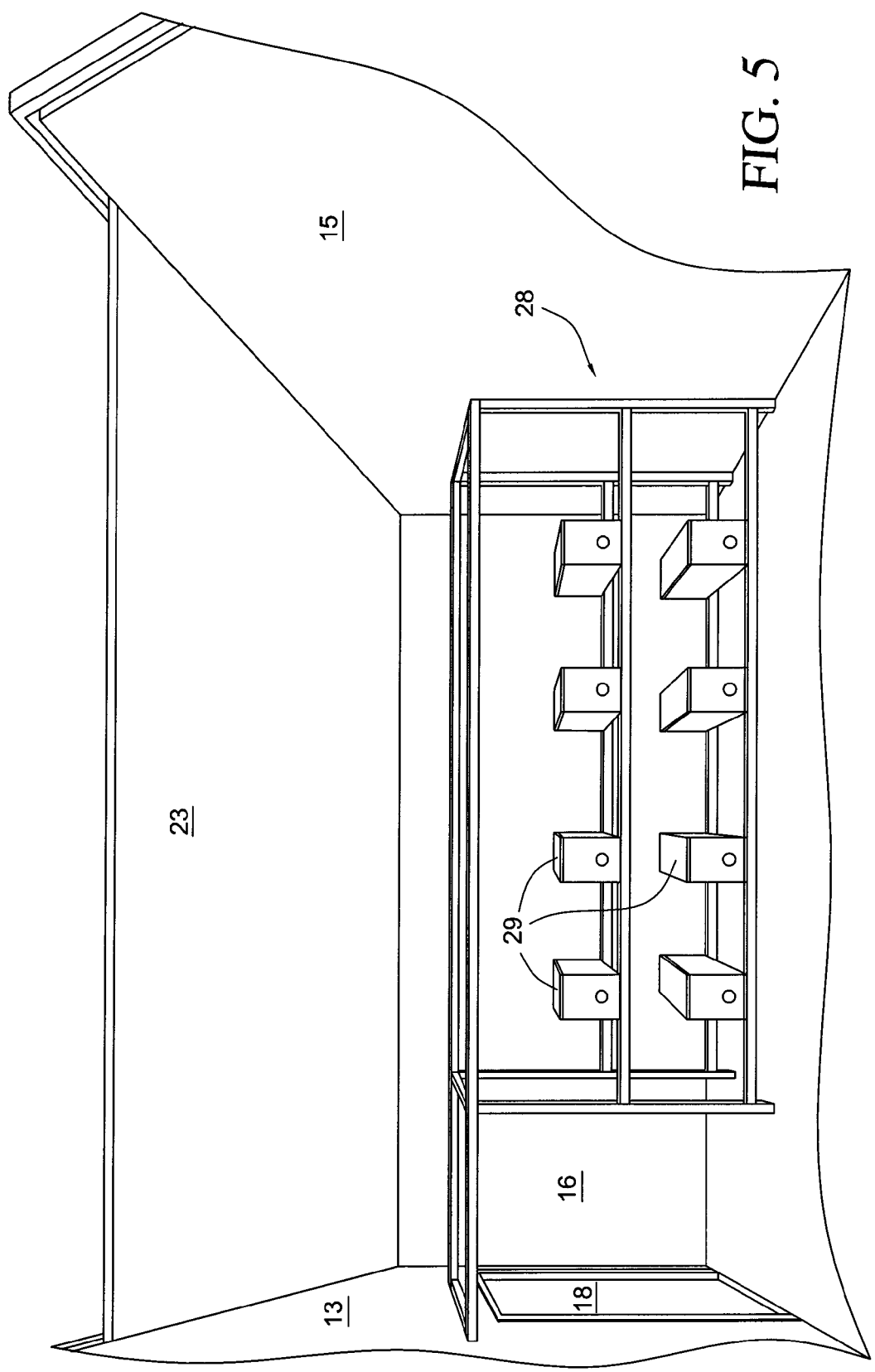
FIG. 5 is a perspective view of the interior of a bee house in accordance with the invention and wherein multiple hives are disposed on multiple shelves.

FIG. 2 is a sectional view of the prior art hive system 100 illustrating a hive chamber 200. The hive chamber 200 is a portion of the hive system 100 interior space bounded by a sub-divider 122 and a center divider 120. Each hive chamber, such as a hive chamber 200, houses one honey bee colony. Inside the hive chamber are two lower frame rests 204' including a front lower frame rest 204' and a rear lower frame rest 202. Preferably the lower frame rest 202 and 204' are ½ inch plywood. The lower frame rests are preferably placed in the hive chamber 200 and held in place only by the dividers and exterior walls and the frames 210. With no permanent fasteners used the frame rests can easily be removed when needed as if they become rotted or damaged. The front rest 204' preferably includes an opening that corresponds to the hive opening 130.

Atop the lower frame rests 202 and 204 sit a plurality of frames. The frames are preferably industry standard, thus compatible with traditional hives. In one design seven frames sit upon the lower frame rests with proper spacing needed to provide correct bee spacing. Additionally, the lower frame rests 202 and 204' serve to maintain proper bee spacing between frames 210 and the exterior walls 104 and the center divider 120. Thus, with the proper bee spacing the bees will not fill the gaps with propulous or draw burr or brace comb out of the gaps either of which would cause the pieces of the hive system to become stuck together and difficult to remove.

Atop the frames 210 sit two upper frame rests 206 and 208. These two upper frame rests are ½ inch plywood. One upper frame rest 206 sits at the rear of the hive chamber 200 adjacent to center divider wall 120. Another upper frame rest 208 sits at the front adjacent the exterior wall 104. Atop these two upper frame rest sits another plurality of frames. Seven frames can sit on the upper frame rest 208 with proper spacing between each frame. Thus, a total of 14 frames reside in hive chamber 200.

The upper frames 206 and 208 rest are preferable notched with two raised portions at each end. The two raised portions at the edges of the top of the upper frame rest prevent the frames from moving all the way to the edge of the frame rest. This provides proper bee spacing between the outer frames and the exterior side walls 108 and sub-dividers 122. These raised portions are ¾ inch tall and have a ⅛ inch width. The two lower frame rests 202 can be notched in similar manner.

The upper frame rest are also preferably dimensioned to hold and be held in place by the dividers, exterior walls and frames. No permanent fasteners are used since the frame rest can be easily removed when needed. As shown in FIG. 1, the hive system also includes a roof 150 with a ridged frame work 152 around the perimeter sized slightly larger than the hive system such that it can slide over the hive system frame work 102. The roof frame work 152 is preferably a metal frame work made from L-shaped metal as for example angle iron. The hive system roof 150 is also a multi-layer design with an exterior portion, a core portion and an interior portion. The exterior portion is preferably ⅛ inch fiberglass with ultraviolet light inhibitors. The fiberglass is preferably sealed to the roof framework 152 with a silicone base sealant.

The core portion of the hive system roof 150 is preferably a material with good insulating qualities such as expanded polystyrene or other insulating foams with the thickness of about ¾ inch. The inner portion of the hive system roof 150 is made of a material which will protect the core portion. As for example, ⅛ inch thick polypropylene. Returning to FIG. 2, the floor 115 in the hive system is preferably a wood floor made from materials such as plywood. Additionally, holes in the floor for each hive chamber are provided and covered with a tight mesh screen or filled with a plastic mesh plug. This allows for further ventilation of the colonies.

A preferred embodiment of the present invention is illustrated in FIGS. 3-6 wherein a bee house 10 includes a generally rectangular frame and four upwardly extending walls 13, 14, 15 and 16 fixed to the generally rectangular frame. In a preferred embodiment of the invention, the bee house has a length of about 6 meters and a width of about 4 meters and is fabricated from a metallic frame covered with metallic sheets. Each of the walls includes a core 17 made of wood or exterior plywood or the like and includes a layer of insulation 11 and a layer or coating of a waterproof paint or the like that is resistant to damage from the sun. In the preferred embodiment of the invention, the interior of the walls are painted white to reflect light that enters the bee house 10.

The bee house 10 also includes a gable roof 20 having a peak 21 and a pair of eaves or lower outer edges 22. In the preferred embodiment, the roof 20 includes two roof panels 23 and 25, one on each side of the peak 21 and a longitudinally extending opening 24 of about four meters along the peak 21 and between the two roof panels 23 and 25. The opening 24 at the peak of the triangular shaped roof 20 allows the bees to enter and leave the bee house 10 to their respective hives disposed on shelves within the bee house 10. The longitudinally opening 24 also allows light to enter into the bee house 10 and to be reflected by the white surfaces of the walls 13-16. The opening 24 has a length of about four meters and a width during Spring and Fall of about 80 cm. During the hot summer months the width is reduced to about 40 cm for reducing the loss of cooling and the size of the exit for the bees.

In the preferred embodiment of the invention the bee house 10 is air conditioned by an air conditioner 26 and is thermally isolated by the insulation on the walls. The air conditioner has a capacity of 2½ tons more or less depending on the overall dimensions of the bee house 10 and is capable of maintaining the interior temperature between about 25° C. to 35° C. In one preferred embodiment of the invention the bee house has a capacity of fifty two bee hives 29 (See FIG. 4-6). In a preferred layout, a beekeeper can examine 36 bee hives without removing the hives from the shelf. The remaining 16 hives can then be examined by removing from a top shelf. In this embodiment, the roof measures 4×6 meters that are closed on the sides but open at the top of the triangle along the peak of the roof. The gable roof 20 has a triangular cross-section and opening at its peak to help spread the light and attracting the moving bees to the exit. A conventional door 18 is provided in the end wall 13.

It is also been found that one bee hive 29 requires 50 cm of horizontal shelf space and 25 cm vertical plus an additional 28 cm above the hive to take out a frame. In other words, each hive requires 50 cm horizontally and 53 cm vertically.

Figure 6:
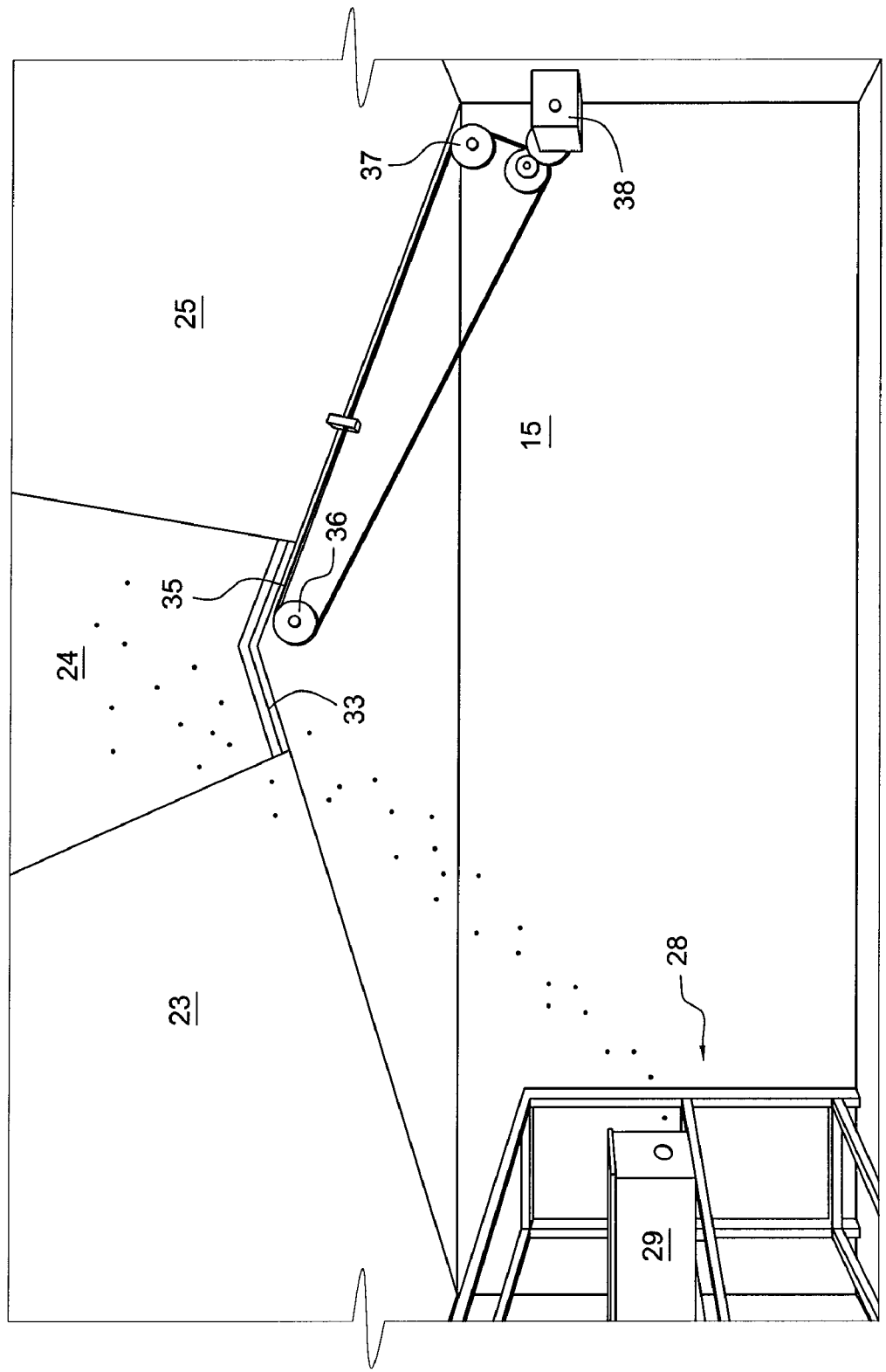
FIG. 6 is schematic illustration of a mechanism for moving opposite roof panels away from or toward an opposite panel to increase or decrease the width of a longitudinal opening at the apex of the roof.

As shown in FIG. 6, the opening 24 may be increased or decreased by means of two roof panels 23 and 25, each of which is disposed in a pair of tracks 33 and 35. Means are provided for moving the panels along the tracks. For example, the means for moving the panels may be of any conventional design as for example a rack and pinion with a manual crank assembly or a pair of pulleys 36 and 37 and a motor 38 as shown or the like. The motor 38 rotates a pulley and belt for moving the panels toward or away from the peak 21 of the roof.

Figure 7:
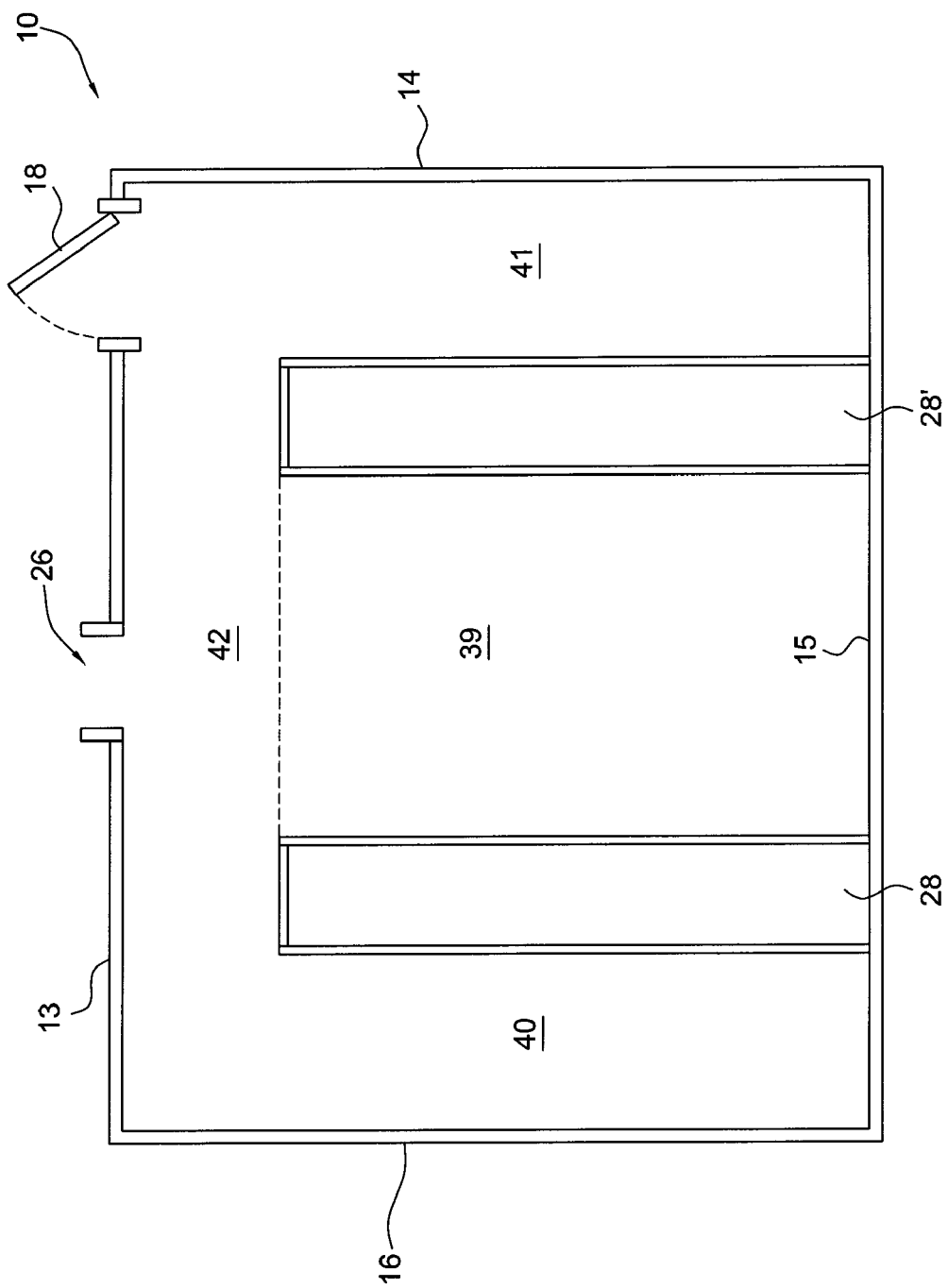
FIG. 7 is a top or plan view illustrating one embodiment of the invention.

A bee house 10 in accordance with one embodiment of the invention as shown in FIG. 7 includes two rows of shelves or "chairs" 28 and 28' disposed across from one another. The "chairs" each include 26 inwardly facing hives 29 (see FIG. 8) so that the hives in one row of chairs face the hives in the other row with a "free space" 39 therebetween. The free space 39 is preferably about 3.25 meters across and approximately square in order to allow the bees to enter and exit the hives through the opening 24 without interference from other bees. The free space 39 is considered "off limits" to the beekeeper in order to allow a free flying area for the bees.

The layout also includes two working spaces 40 and 41 behind each chair including hives 29 that allows a beekeeper to have access to the hives 29 without interfering with the flight path of the bees. These spaces 40 and 41 each have a width of about 0.9 meters. An additional "connecting" space 42 outside of the free space 39 allows the beekeeper to move from behind one row of shelves 28 to behind the second row of shelves 28' and out of the door 18 without passing through the free space 39.

Figure 8:
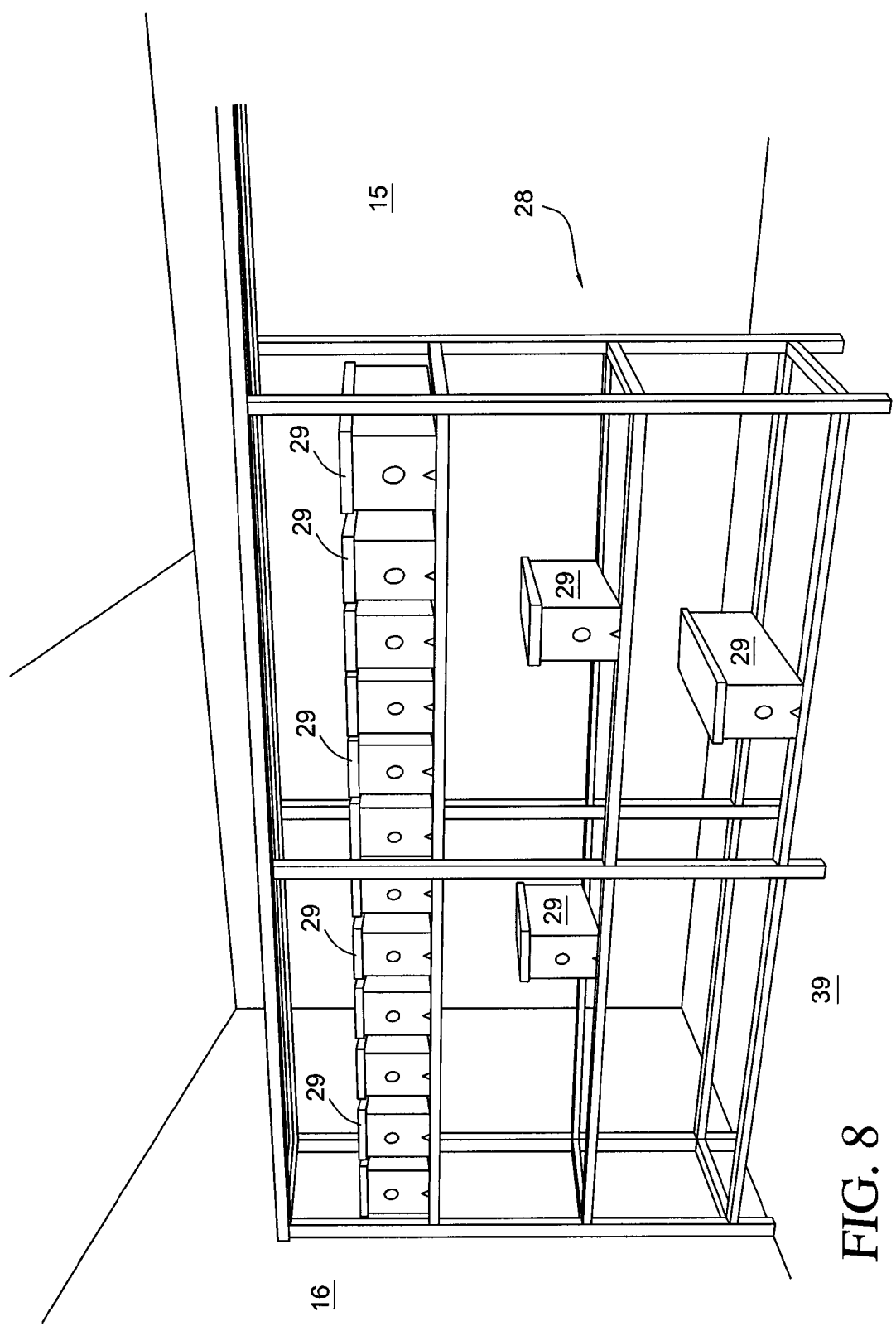
FIG. 8 is a schematic illustration of a plurality of bee hives arranged on a plurality of shelves.

As shown in FIGS. 7 and 8 the hives 29 across from one another are preferably spaced at a distance of about 3.25 meters in order to allow the bees from one hive to avoid colliding with the bees from another hive. As shown the hives are relatively close to one another. For example in a preferred embodiment of the invention, two opposite inwardly facing chairs include six lower shelves with a length of about 1.5 meters for positioning or disposing three hives 29 on each shelf. In this arrangement the six lower shelves are arranged in two side-by-side rows with a top shelf of about 4 meters joining the two rows. With three hives on each shelf and eight hives on the top shelf each chair includes twenty-six hives for a total of fifty two hives in the bee house 10. In practice each of the hives has the capacity of ten frames.

It has been found that with the high capacity for bees it is important that the beekeeper stay out of the free area 39 to avoid exciting the bees. It is also been found that the hives, other than those on the top shelf, can be examined while remaining on a shelf.

While the invention has been described in connection with its accompanying drawings it should be recognized that changes and modifications may be therein without departing from scope of the appended claims.

What is claimed is:

1. A bee house for housing a plurality of bee hives, said bee house comprising:

a generally rectangular frame and four upwardly extending metallic walls including a core of wood or plywood, a layer of insulation and white interior walls for reflecting light;

a gable roof having a generally triangular cross section, a peak and a pair of roof panels, each of which has a lower outer edge below said peak and wherein said gable roof defines a longitudinal opening having a width along said peak and between said roof panels, and means for increasing and decreasing the width of said opening and in which said means for increasing and decreasing the width of said opening includes a rack and pinion gear and manual crank for increasing or decreasing the width of said longitudinal opening between said roof panels;

a plurality of bee hives distributed between two chairs or shelves with a capacity for holding fifty-two bee hives with the bee hives in one of said chairs or shelves facing the bee hives in the other of said chairs or shelves with a free space therebetween and working space behind each of said chairs or shelves; and air-conditioning means for maintaining the temperature within said bee house between about 25° C. and 35° C.

2. A bee house for housing a plurality of bee hives in which said bee house consists of:

a generally rectangular frame having a length of about 6 meters and a width of about 4 meters and four upwardly extending metallic walls including a core of wood or plywood and a layer of insulation;

two chairs or shelves and twenty-six bee hives disposed in each of said two chairs or shelves with the bee hives in one row of chairs or shelves facing the bee hives in an opposite row of chairs or shelves with a free space having a width of about 3.25 meters between said rows of chairs or shelves;

a gable roof having a generally triangular cross-section; and said gable roof having a peak and a pair of roof panels each with a lower outer edge below said peak and wherein said gable roof includes an opening between said two roof panels;

means for increasing and decreasing the width of the opening between about 40 cm and 80 cm and in which said means for increasing and decreasing the width of said opening includes a rack and pinion gear and manual crank;

two working spaces each of which have a width of about 0.9 meters with one of said working spaces behind each of said chairs or shelves and a third space for connecting said two working spaces without crossing said free space; and an air conditioner of about 2½ ton capacity for maintaining the temperature within said bee house between 25° C. and 35° C.

* * * * *